United States Patent
Wright

(10) Patent No.: US 10,065,873 B2
(45) Date of Patent: Sep. 4, 2018

(54) METHOD AND APPARATUS FOR STATIC MIXING OF MULTIPLE OPPOSING INFLUENT STREAMS

(71) Applicant: ClearCove Systems, Inc., Victor, NY (US)

(72) Inventor: Terry Wright, Rochester, NY (US)

(73) Assignee: ClearCove Systems, Inc., Victor, NY (US)

( * ) Notice: Subject to any disclaimer, the term of this patent is extended or adjusted under 35 U.S.C. 154(b) by 92 days.

(21) Appl. No.: 15/255,792

(22) Filed: Sep. 2, 2016

(65) Prior Publication Data

US 2018/0065871 A1  Mar. 8, 2018

(51) Int. Cl.
| | | |
|---|---|---|
| *B01D 21/24* | (2006.01) | |
| *B01F 5/12* | (2006.01) | |
| *C02F 1/52* | (2006.01) | |
| *B01F 5/02* | (2006.01) | |
| *B01D 21/00* | (2006.01) | |
| *C02F 1/00* | (2006.01) | |

(52) U.S. Cl.
CPC ........ *C02F 1/5281* (2013.01); *B01D 21/0042* (2013.01); *B01D 21/2416* (2013.01); *B01F 5/0256* (2013.01); *C02F 2001/007* (2013.01); *C02F 2301/024* (2013.01)

(58) Field of Classification Search
CPC ............ B01D 21/0042; B01D 21/0087; B01D 21/2405; B01D 21/2416; C02F 1/5281; B01F 3/0873; B01F 5/0206; B01F 5/0256
USPC .............................. 210/801, 519; 366/162.4
See application file for complete search history.

(56) References Cited

U.S. PATENT DOCUMENTS

| | | | | | |
|---|---|---|---|---|---|
| 1,493,861 | A | | 5/1924 | Kusch | |
| 3,409,042 | A | * | 11/1968 | Anthony | ................ F16K 19/00 366/162.4 |
| 4,278,545 | A | * | 7/1981 | Batutis | ............... B01D 21/2416 210/521 |
| 4,406,789 | A | * | 9/1983 | Brignon | ................ B01D 17/02 210/519 |
| 5,458,777 | A | * | 10/1995 | Khatib | ............... B01D 21/2416 210/519 |
| 5,637,234 | A | * | 6/1997 | McCasland | ............ B01D 17/00 210/519 |
| 6,276,537 | B1 | * | 8/2001 | Esler | ................. B01D 21/2416 210/519 |
| 9,782,696 | B2 | | 10/2017 | Goriawala et al. | |

(Continued)

FOREIGN PATENT DOCUMENTS

DE         9419662       *   2/1995

*Primary Examiner* — Christopher Upton
(74) *Attorney, Agent, or Firm* — Harris Beach PLLC; Neal L. Slifkin

(57) ABSTRACT

A settling tank for receiving an influent stream separated into first and second influent streams and recombined under pressure in the settling tank. The settling tank comprises first and second pipes for conveyance of the first and second influent streams to a turbulent mixing zone wherein the first and second pipes terminate in first and second longitudinally parallel manifolds, each having a plurality of longitudinally arrayed holes defining first and second hole arrays. Each of the first and second arrays is directed in opposition to the other of the first and second arrays such that influent flows from the respective holes thereof can collide to cause turbulent mixing in said turbulent mixing zone.

8 Claims, 3 Drawing Sheets

(56) References Cited

U.S. PATENT DOCUMENTS

2003/0217971 A1* 11/2003 Varadaraj ............. B01D 17/045
                                                  210/519
2011/0180152 A1*  7/2011 Dorsch ................ B01F 5/0206
                                                  137/15.05
2013/0083620 A1*  4/2013 Hypes ................ B01D 21/0087
                                                  366/136
2016/0008744 A1   1/2016 Wright

* cited by examiner

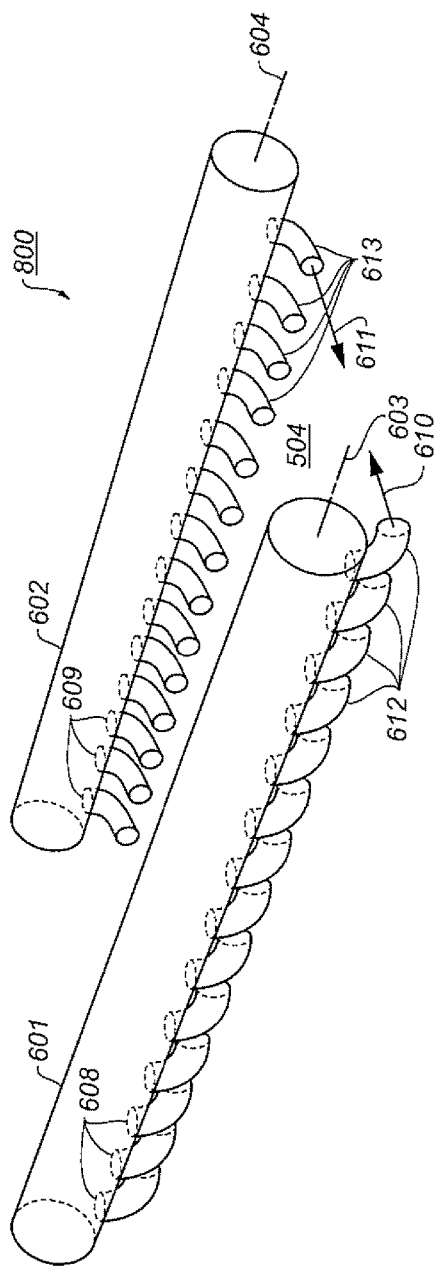
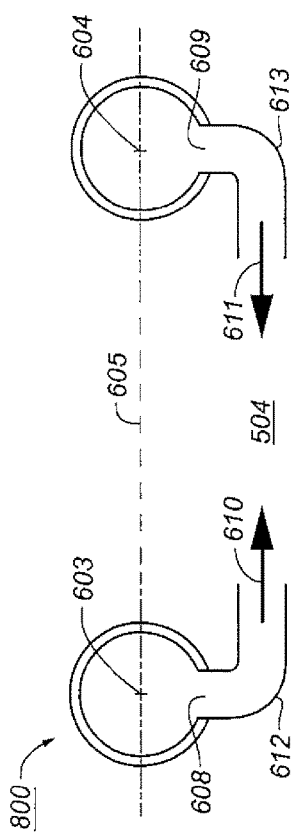
FIG. 4
FIG. 5

METHOD AND APPARATUS FOR STATIC MIXING OF MULTIPLE OPPOSING INFLUENT STREAMS

FIELD OF THE APPLICATION

This application relates to systems for waste water separation, recovery, and clarification; more particularly, to such systems employing a settling tank; and most particularly, to a system wherein an influent stream entering such a settling tank is subject to static mixing by being separated into two streams that are then directed against each other via first and second manifolds, each manifold having a plurality of openings, wherein influent stream flows from such openings in the first manifold are directed toward influent stream flows from the openings in the second manifold. As used herein, "dynamic" means a mechanically driven mixer, whereas "static" or "non-dynamic" means mixing with no moving parts.

BACKGROUND OF THE INVENTION

During the treatment of waste water, one goal is to selectively remove and separate the various solids and dissolved materials from the influent. Waste water treatment systems are used in a number of applications including but not limited to the treatment of sewage, storm water, industrial waste, mining and agriculture. Many prior art waste water treatment systems maintain a continuous flow of influent entering the primary settling tank and effluent exiting the primary settling tank for secondary treatment, resulting in the incomplete removal of grit, solids, and particulates and little if any separation of desirable materials from undesirable materials.

An influent feed system (IFS) to classify and separate particulate matter and solvated materials from an influent stream may include one or more influent feed troughs in fluid communication with a clarification tank, also referred to herein as a settling tank. The influent feed troughs have dimensions such that the fluid level rise rate in an influent feed trough is less than the settling rate of materials to be deposited in the influent feed troughs.

One or more settling tanks are in fluid communication with the one or more influent feed troughs. The one or more settling tanks have dimensions which result in a fluid rise rate in each settling tank that is low relative to the settling rate of materials to be deposited in the one or more settling tanks. In some applications, the settling tank is operated in batch mode with intermittent, influent flow and is substantially emptied between fillings.

Each settling tank includes a hopper bottom for accumulation of the materials to be deposited prior to controlled evacuation and connection to an influent source. The hopper bottom has a drainage pipe and a valve in support of controlled evacuation. The influent stream may be separated into two or more streams and recombined under pressure in the one or more settling tanks.

In yet another prior art embodiment, the influent stream delivery mechanism includes a reservoir which accumulates and stores influent, and may include one or more pumps that pump the influent to the influent feed system, and a signal source which turns the pumps on. Alternatively, the reservoir is elevated relative to the influent feed system and in fluid communication with the influent feed system. A control valve is disposed between the reservoir and the influent feed system. The control valve is configured to deliver the influent stream under a gravity head at a pre-determined and substantially constant flow rate, the control valve opening in response to a signal source to permit influent to traverse under an influence of gravity to the one or more settling tanks. The reservoir may include a holding tower.

In another embodiment, the influent feed system further includes a flow meter that measures a flow rate of fluid wherein the system closes the control valve in response to the flow rate falling below a predetermined rate.

In yet another embodiment, the influent feed system includes one or more screen box assemblies that discharge screened influent (also referred to herein as clarified influent) from each settling tank after separation of solids from the influent stream.

According to another aspect, a settling tank to classify and separate particulate matter and solvated organic materials from an influent stream includes an upper portion and a lower portion. The upper portion has a fluid discharge mechanism, e.g., a floating decanter, and the lower portion is coupled to sludge removal apparatus, e.g., a drainage pipe comprising a valve that controls communication of materials between an influent feed system and the drainage pipe, or a bucket-and-chain drag. One or more of the dimensions of the upper portion and the lower portion causes a fluid rise rate that is low relative to the settling rate of materials to be deposited in the settling tank. A deflection plate is positioned between the upper portion and the lower portion. An influent stream delivery mechanism is configured to deliver the influent stream at a predetermined and substantially constant flow rate, although flow of influent into the settling tank may be intermittent. A hopper accumulates one or more deposited materials. The influent stream is separated into two or more streams. The separated influent is recombined in a turbulent static mixing zone created by delivering the separated influent streams under pressure from two or more opposing pipes.

In one embodiment, the influent feed system includes an apparatus to add one or more coagulants and/or flocculating chemicals to the influent stream before the influent stream enters the one or more settling tanks.

A problem exists in the prior art wherein the settling action of added coagulants and/or flocculating chemicals proceeds relatively slowly and thus causes BOD-containing settling solids to be deposited at various points along the influent flow path. The prior art arrangement wherein the influent stream is divided into two streams and then recombined is intended to cause turbulent mixing of the flocculent-containing streams to encourage faster settling within the settling tank itself.

What is needed in the art is a method and apparatus for producing more rapid and complete static mixing and flocculation within the settling tank.

SUMMARY OF THE INVENTION

Current waste water treatment systems often use coagulants and/or flocculants to remove solids and solvated materials from the influent. A problem with current systems is that the devices used to provide mixing of coagulants and/or flocculants with the influent stream can result in uncontrolled settling and depositing of solids in undesirable locations, resulting in lower flow rates and maintenance issues associated with removing the deposits. Another problem with current systems is that during periods of high flow, or due to inadequate mixing, it may be necessary to use a ballasted floc reactor to assist with primary clarification. In a ballasted floc reactor, sand is added as ballast in addition to the flocculants to achieve necessary deposition of solids and solvated materials from the influent stream. Sand is an undesirable additive as it creates expense and adds volume to the deposits. Generally, the present invention eliminates the need for added sand.

In accordance with the present invention, mixing of the coagulants and/or flocculent chemicals and influent can be controlled to cause deposition of the solids in a predetermined portion of the settling tank. By reducing solid deposition in the IFS, system maintenance can be substantially minimized.

An influent feed system to classify and separate particulate matter and solvated materials from an influent stream comprises an influent stream delivery mechanism that delivers an influent stream to a settling tank, having preferably a hopper bottom. The influent stream is separated into first and second influent streams delivered to the settling tank via first and second conduits. The first and second conduits terminate in first and second parallel manifolds, respectively, each having a plurality of longitudinally arrayed holes defining first and second hole arrays. The settling tank may include a deflector plate transversely disposed within the settling tank, and typically the manifolds are disposed beneath such a deflector plate, creating a turbulent mixing zone for recombining the first and second influent streams.

In a first embodiment, the holes in each of the first and second hole arrays are directed in opposition to the holes in the other of the first and second hole arrays.

In a second embodiment, the holes in each of the first and second longitudinally parallel manifolds are oriented downward and a respective plurality of first and second elbow bend pipes are inserted into each of the first and second arrayed holes. The elbow bend pipes are oriented such that influent discharges from first elbow bend pipe openings are directed either directly or at an angle toward influent discharges from the second elbow bend pipe openings.

The foregoing and other objects, aspects, features, and advantages of the invention will become more apparent from the following description and from the claims.

BRIEF DESCRIPTION OF THE DRAWINGS

The objects and features of the application can be better understood with reference to the drawings described below, and the claims. The drawings are not necessarily to scale, emphasis instead generally being placed upon illustrating the principles of the application. In the drawings, like numerals are used to indicate like parts throughout the various views, wherein:

FIG. 4 is a perspective view from above of a second embodiment of a settling tank manifold assembly in accordance with the present invention; and FIG. 5 is a cross-sectional elevational view of the second embodiment shown in FIG. 4.

DETAILED DESCRIPTION OF THE INVENTION

As discussed hereinabove, during the treatment of waste water, one goal is to selectively remove and separate the various solids and dissolved materials from the influent.

Current waste water treatment systems maintain a continuous flow of influent entering a primary settling tank and effluent exiting the primary settling tank for secondary treatment, typically resulting in the incomplete removal of grit, solids, and particulates from the influent and little if any separation of desirable materials from undesirable materials.

It is well known that separation of such materials can be improved by the addition of coagulant and/or flocculent chemicals to the influent stream, especially if the stream is then subjected to mixing. A problem with prior art waste water treatment systems is that the mixing devices, either static or dynamic, used to provide adequate mixing of coagulant and/or flocculent chemicals with the influent stream can be readily fouled.

Thus, there is a need for a system and method for improved mixing which can more efficiently settle BOD particles in a settling tank.

In one exemplary embodiment, the influent stream is split into two or more separate streams which are then recombined under pressure to create a turbulent non-dynamic mixing of the recombined streams with a coagulant and/or flocculent chemical that promotes rapid action of the chemical with the solids and/or solvated materials, reducing or eliminating the need for sand, and results in the deposition of solids in a controlled portion of the clarification system.

The present invention is directed to an improved method and apparatus for static mixing of an influent stream with coagulants and/or flocculants during such recombination of two separate influent streams in a settling tank.

Figure 1:
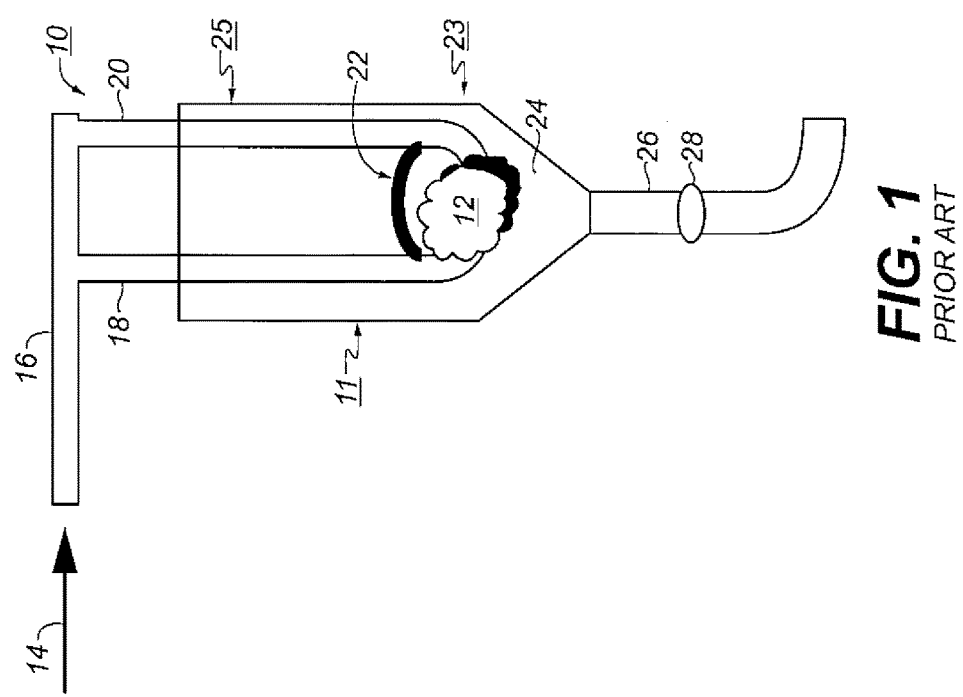
FIG. 1 is a schematic elevational view of a prior art influent feed system.

FIG. 1 shows a schematic elevational view of an exemplary prior art influent feed system 10 used to supply influent to a settling tank 11. A mixing zone 12 is created within influent feed system 10 at the location where deposition of solids is desired. Influent 14 is delivered to influent feed system 10 via pipe 16 and is split into two streams which enter settling tank 11 via inlet pipes 18,20. The streams exit opposing pipes 18,20 and collide under pressure to create turbulent mixing zone 12. A deflector plate 22 is positioned above mixing zone 12 to confine the volume of the mixing zone. Dense solids and floc are deposited in a lower portion 23 of settling tank 11 in a tank hopper bottom 24.

Materials settled in influent feed system 10 can be removed from hopper bottom 24 via discharge pipe 26 and outlet valve 28. Clarified effluent can be removed from an upper portion 25 of influent feed system 10 via, e.g., a conventional decanter (not shown).

Referring now to FIGS. 2-5, in accordance with the present invention, each of the prior art inlet pipes is provided at its distal end adjacent turbulent mixing zone 12 with respective first and second manifolds 601,602, preferably in the form of pipes having respective longitudinal axes 603, 604. Alternatively (not shown), pipe 16 may be bifurcated within tank 11 itself. Pipes 18,20 may engage manifolds 601,602 at any convenient location on the manifolds, e.g., at an end thereof (502a,503a) wherein the opposite end 608, 609 is capped, or at an intermediate location thereof (502b, 503b) wherein both ends are capped (not shown). Preferably axes 603,604 are substantially parallel and therefore lie in a common plane 605 and may assume any desired orientation between vertical and horizontal with respect to gravity and the structure of settling tank 11. Each of manifolds 601,602 is provided with a respective plurality of holes 606,607 arranged in first and second longitudinal arrays for discharge of a plurality of influent jets 610,611 in a direction substantially orthogonal to axes 603,604.

Figure 2:
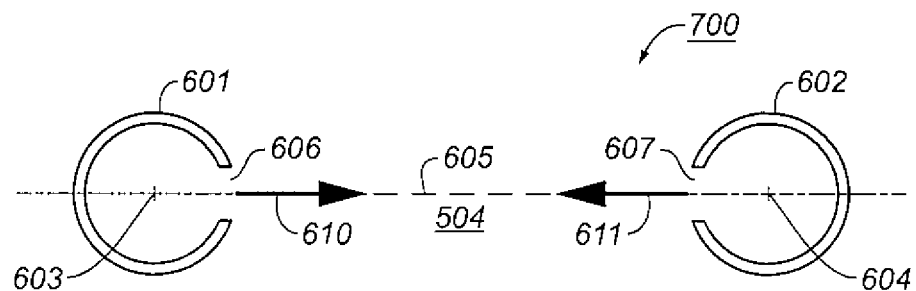
FIG. 2 is a cross-sectional view of a first embodiment of a settling tank manifold assembly in accordance with the present invention, taken along line 2-2 in FIG. 3.
Figure 3:
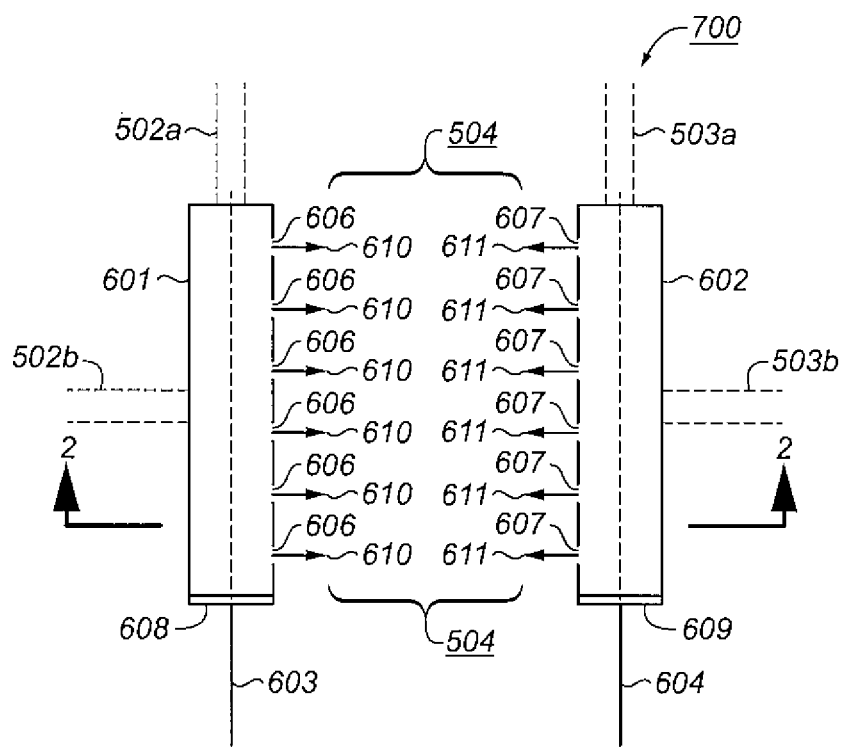
FIG. 3 is a plan view of the settling tank manifold assembly shown in FIG. 2.

In a first embodiment 700, as shown in FIGS. 2 and 3, manifolds 601,602 are positioned such that holes 606,607 lie in common plane 605. It will be seen that resulting jets 610,611 are directly opposed to each other and therefore will collide turbulently within a new turbulent mixing zone 504. It is believed that each individual opposed pair of jets 610,611 creates its own mini-turbulent mixing zone, and therefore the overall mixing of influent within mixing zone 504 is greatly improved and accelerated over the prior art single mixing pair shown in FIG. 1.

In a second embodiment 800, as shown in FIGS. 4 and 5, first and second longitudinal arrays 608,609 do not lie in axial common plane 605. Each hole is provided with a non-linear outlet pipe 612,613 having an included angle of bend preferably between about 75 degrees and about 105 degrees, e.g., a 90 degree elbow, such that influent jets 610,611 may be directly opposed to each other as in first embodiment 700.

Second embodiment 800 has two potential advantages over first embodiment 700.

First, if pipe axes 603,604 are horizontal as may be arranged in first embodiment 700, settled solids may accumulate undesirably within manifolds 601,602 below the level of outlet holes 606,607 (FIG. 2). Providing hole arrays 608,609 (FIGS. 4 and 5) along the bottom of each manifold 601,602 prevents this from occurring.

Second, each outlet pipe 612,613 may be individually angled with respect to the opposing manifold as desired to create greater or lesser mini-turbulent zones within turbulent mixing zone 504.

While the present system and method has been particularly shown and described as illustrated in the drawings, it will be understood by one skilled in the art that various changes in detail may be effected therein without departing from the spirit and scope of the application as defined by the claims.

What is claimed is:

1. A settling tank to classify and separate particulate matter and solvated organic materials from an influent stream divided into first and second influent streams, comprising:
    an upper tank portion and a lower tank portion, said upper tank portion having a fluid discharge mechanism, and said lower portion being coupled to a solids-removal mechanism;
    first and second pipes for conveyance of said first and second influent streams to a turbulent mixing zone in said settling tank,
    wherein said first and second pipes terminate in respective first and second longitudinally parallel manifolds, each of said first and second manifolds having a plurality of longitudinally arrayed holes defining first and second hole arrays; and
    a deflector plate transversely disposed within said settling tank above said turbulent mixing zone.

2. A settling tank in accordance with claim 1 wherein each of said first and second hole arrays is directed in general opposition to the other of said first and second hole arrays such that influent flows from the respective holes thereof can collide to cause turbulent mixing in said turbulent mixing zone.

3. A settling tank in accordance with claim 1, wherein said turbulent mixing zone is formed beneath said deflector plate.

4. A settling tank in accordance with claim 1, wherein the holes of each of said first and second arrays are directed in other than opposition to the other of said first and second arrays, and wherein said arrayed holes are each provided with a non-linear outlet pipe having an included angle of bend such that influent flows from respective generally opposed ends of opposed of said outlet pipes disposed in said first and second arrays can collide.

5. A settling tank in accordance with claim 4 wherein said first and second pluralities of first and second non-linear pipe openings are oriented such that influent discharges from said first non-linear outlet pipe openings are directed directly toward influent discharges from said second non-linear outlet pipe openings.

6. A settling tank in accordance with claim 4 wherein said angle of bend is between 75 degrees and 105 degrees.

7. A settling tank in accordance with claim 4 wherein said first and second pluralities of first and second non-linear pipe openings are oriented such that influent discharges from said first non-linear pipe openings and influent discharges from said second non-linear pipe openings collide in other than direct opposition.

8. A method for mixing influent entering into a settling tank, comprising the steps of:
    dividing the flow of said influent into first and second influent streams;
    providing first and second pipes for conveyance of said first and second influent streams to a turbulent mixing zone in said settling tank, wherein said first and second pipes terminate in first and second longitudinally parallel manifolds, each having a plurality of longitudinally arrayed holes defining first and second hole arrays wherein each of said first and second hole arrays is directed in opposition to the other of said first and second hole arrays, and providing a deflector plate transversely disposed within said settling tank above said turbulent mixing zone; and
    passing said first influent stream through said first manifold to cause a first plurality of first influent flows to flow from said first hole array toward said second hole array, and passing said second influent stream through said second manifold to cause a second plurality of second influent flows to flow from said second hole array toward said first hole array such that said first plurality of said first influent flows collide with said second plurality of said second influent flows in said turbulent mixing zone below said deflector plate.

* * * * *